(12) United States Patent
Park et al.

(10) Patent No.: US 9,904,639 B2
(45) Date of Patent: Feb. 27, 2018

(54) INTERCONNECTION FABRIC SWITCHING APPARATUS CAPABLE OF DYNAMICALLY ALLOCATING RESOURCES ACCORDING TO WORKLOAD AND METHOD THEREFOR

(71) Applicant: SAMSUNG ELECTRONICS CO., LTD, Suwon-si (KR)

(72) Inventors: Chanju Park, Seoul (KR); Sungmin Lee, Suwon-si (KR)

(73) Assignee: SAMSUNG ELECTRONICS CO., LTD. (KR)

(*) Notice: Subject to any disclaimer, the term of this patent is extended or adjusted under 35 U.S.C. 154(b) by 171 days.

(21) Appl. No.: 14/775,030

(22) PCT Filed: Mar. 12, 2014

(86) PCT No.: PCT/KR2014/002072
§ 371 (c)(1),
(2) Date: Sep. 11, 2015

(87) PCT Pub. No.: WO2014/142553
PCT Pub. Date: Sep. 18, 2014

(65) Prior Publication Data
US 2016/0026590 A1    Jan. 28, 2016

(30) Foreign Application Priority Data

Mar. 12, 2013 (KR) .................. 10-2013-0025991

(51) Int. Cl.
| | |
|---|---|
| *G06F 13/00* | (2006.01) |
| *G06F 13/40* | (2006.01) |
| *G06F 1/20* | (2006.01) |
| *G06F 1/32* | (2006.01) |
| *G06F 9/50* | (2006.01) |
| *G06F 9/455* | (2018.01) |

(52) U.S. Cl.
CPC .......... *G06F 13/4022* (2013.01); *G06F 1/206* (2013.01); *G06F 1/3287* (2013.01);
(Continued)

(58) Field of Classification Search
None
See application file for complete search history.

(56) References Cited

U.S. PATENT DOCUMENTS

| | | |
|---|---|---|
| 8,140,719 B2 | 3/2012 | Lauterbach et al. |
| 2005/0044284 A1* | 2/2005 | Pescatore ............ G06F 13/4009 710/15 |

(Continued)

FOREIGN PATENT DOCUMENTS

| | | |
|---|---|---|
| KR | 1020110121206 | 11/2011 |
| KR | 1020120013074 | 2/2012 |

OTHER PUBLICATIONS

International Search Report of PCT/KR2014/002072 dated Jun. 19, 2014.

*Primary Examiner* — Elias Mamo
(74) *Attorney, Agent, or Firm* — McAndrews, Held & Malloy, Ltd.

(57) ABSTRACT

The present invention relates to an interconnection fabric switching apparatus capable of dynamically allocating resources according to a workload and a method therefore, and the apparatus provided with a switching connection part according to the present invention is characterized by including: at least one computing node, a switching connection part for switch-interconnecting the computing node and the input/output node; and a controller for analyzing the workload of the computing node so as to determine whether to transfer the virtual machine of a first computing node to a second computing node, wherein the control unit controls the virtual machine of the first computing node to be transferred through the switching connection part to the second computing node.

10 Claims, 8 Drawing Sheets

(52) U.S. Cl.
CPC ........ *G06F 9/45558* (2013.01); *G06F 9/5088* (2013.01); *G06F 9/5094* (2013.01); *G06F 2009/4557* (2013.01); *G06F 2009/45579* (2013.01); *Y02B 60/1235* (2013.01); *Y02B 60/1275* (2013.01); *Y02B 60/1282* (2013.01); *Y02B 60/142* (2013.01); *Y02B 60/162* (2013.01)

(56) References Cited

U.S. PATENT DOCUMENTS

| | | | |
|---|---|---|---|
| 2005/0060590 A1* | 3/2005 | Bradley | G06F 9/5077 713/320 |
| 2006/0005189 A1* | 1/2006 | Vega | G06F 9/4856 718/1 |
| 2008/0184229 A1* | 7/2008 | Rosu | G06F 9/5088 718/1 |
| 2009/0292858 A1* | 11/2009 | Lambeth | H04L 29/12839 711/6 |
| 2010/0296520 A1 | 11/2010 | Matthews et al. | |
| 2012/0226866 A1 | 9/2012 | Bozek et al. | |
| 2013/0111492 A1* | 5/2013 | Nojiri | G06F 1/206 718/104 |
| 2013/0275568 A1* | 10/2013 | Nguyen | H04L 41/0806 709/223 |
| 2014/0082614 A1* | 3/2014 | Klein | G06F 9/45558 718/1 |
| 2015/0071091 A1* | 3/2015 | Govil | H04L 41/046 370/252 |
| 2016/0139946 A1* | 5/2016 | Gardner | G06F 9/45558 718/1 |

\* cited by examiner

INTERCONNECTION FABRIC SWITCHING APPARATUS CAPABLE OF DYNAMICALLY ALLOCATING RESOURCES ACCORDING TO WORKLOAD AND METHOD THEREFOR

CROSS-REFERENCE TO RELATED APPLICATIONS/INCORPORATION BY REFERENCE

This application is a 371 of International Patent Application No. PCT/KR2014/002072, filed Mar. 12, 2014, entitled "INTERCONNECTION FABRIC SWITCHING APPARATUS CAPABLE OF DYNAMICALLY ALLOCATING RESOURCES ACCORDING TO WORKLOAD AND METHOD THEREFOR", which claims priority to Korean Patent Application No. 10-2013-0025991, filed Mar. 12, 2013, entitled "APPARATUS AND METHOD FOR DYNAMIC RESOURCE ALLOCATION BASED ON INTERCONNECT FABRIC SWITCHING". The above-identified applications are hereby incorporated herein by reference in their entirety.

TECHNICAL FIELD

The present invention relates to an interconnected fabric switching, and more particularly, to an apparatus and method for switching an interconnection fabric switch so as to dynamically allocate resources according to a workload.

BACKGROUND ART

Recently, power problems are emerging in various computing areas including a data center. In order to solve the seriousness of the power problem, a low-power server, such as, a micro server has been released. FIG. 1 is a diagram showing the internal structure of micro server.

As shown in FIG. 1, the micro server is an architecture in which a plurality of cards are stacked, and each card includes a computing card 110, an HDD and/or SSD 120, a storage card 130, an Ethernet card 140, and a mid-plane interconnection card 150.

A card including the above components, stacked in multiple, configures a micro server.

The micro server uses a low-power Central Processing Unit (CPU) and limits unnecessary and redundant uses relating to a conventional input/output device. Thus, the micro server can reduce the power and an occupied space by ¼ compared to a conventional server.

The micro server has been used for low power computing within a data center. However, the micro server has hardware and software designed only for a workload having a particular purpose. In addition, the micro server is designed to reduce the input/output device use and volume by integrating the input and output devices of conventional servers, and thus the performance may be degraded due to frequent input and output requests.

Therefore, research is needed relating to a micro server and a server for enhancing the performance and maximizing low power in the data center server cluster system.

DISCLOSURE OF INVENTION

Technical Problem

The present invention has been made in order to solve the above problems and an aspect of the present invention is to provide an interconnection fabric switching apparatus and method for improving the performance of a computing node to address power issues of a data center and the like.

More particularly, the present invention is to maximize the performance of low-power computing in a data center or a server cluster structure in which a plurality of computing nodes are interconnected so that the computing nodes are selectively operated according to a workload and, during an exchange of information, the information between each of the nodes is directly exchanged through a switching connection unit (an interconnection fabric switch) without passing through a network node.

Solution to Problem

In order to solve the above problems, there is provided an apparatus for controlling a switching connection for at least one node. The apparatus includes: at least one computing node; a switching connection unit that switching-interconnects between the computing node and an input/output node; and a controller that analyzes a workload on the computing node, determines whether to migrate a virtual machine of a first computing node to a second computing node according to the analyzed result, and when it is determined to migrate the virtual machine, controls the switching operation of the switching connection unit to migrate the virtual machine of the first computing node to the second computing node via the switching connection unit.

In addition, there is provided a method for controlling a switching connection for at least one node. The method includes the steps of: analyzing a workload on at least one computing node; determining whether to migrate the virtual machine of a first computing node to a second computing node, according to the analyzed result; when it is determined to migrate the virtual machine, switching a switching connection unit so as to migrate the virtual machine of the first computing node to the second computing node via the switching connection unit; and migrating the virtual machine from the first computing node to the second computing node through the switching connection unit, wherein the switching connection unit switching-interconnects between the computing node and the input/output node.

Advantageous Effects of Invention

According to the present invention, during an exchange of information between computing nodes, the information is directly exchanged through a switching connection unit (in particular, an interconnection fabric switch) without passing through input and output nodes such as network nodes. Accordingly, the time for exchanging, migrating, and copying the information can be significantly reduced to maximize the low-power computing performance.

Further, according to the present invention, a virtual machine, etc. is migrated from a first computing node to a second computing node according to a workload and then the power of the first computing node is turned off, and thus the computing and input and output resources are effectively managed and savings in operating costs are also possible.

MODE FOR THE INVENTION

Figure 1:
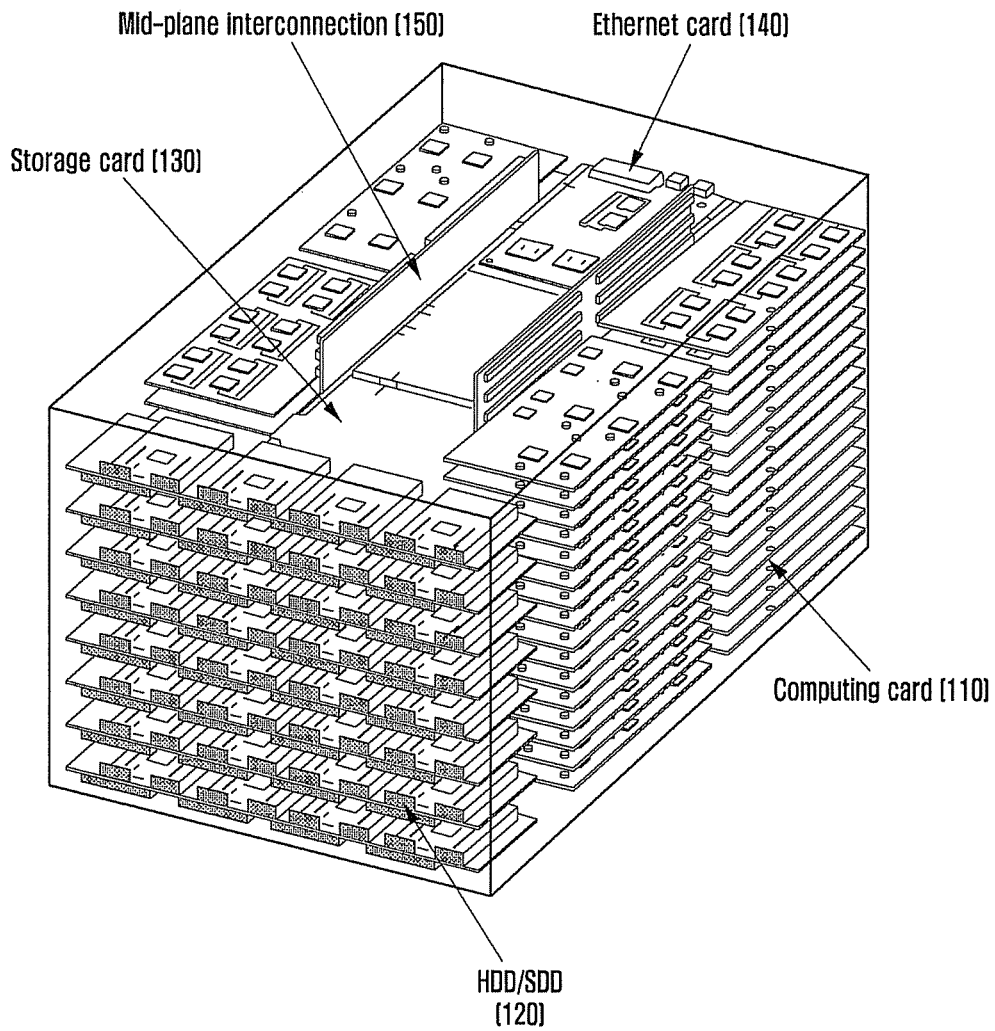
FIG. 1 is a diagram showing an internal structure of a micro server.

A computing node, in an embodiment of the present invention which will be described below, refers to a node having a computing capability capable of performing a specific work for a given task. According to an embodiment of the invention, the computing node may include a server and a micro server.

Hereinafter, exemplary embodiments of the present invention will be described in detail with reference to the accompanying drawings. It is noted that, where possible, the same reference numerals are designated to the same components in the accompanying drawings. Further, a detailed description of a known function and configuration which may make the subject matter of the present invention unclear will be omitted.

Figure 2:
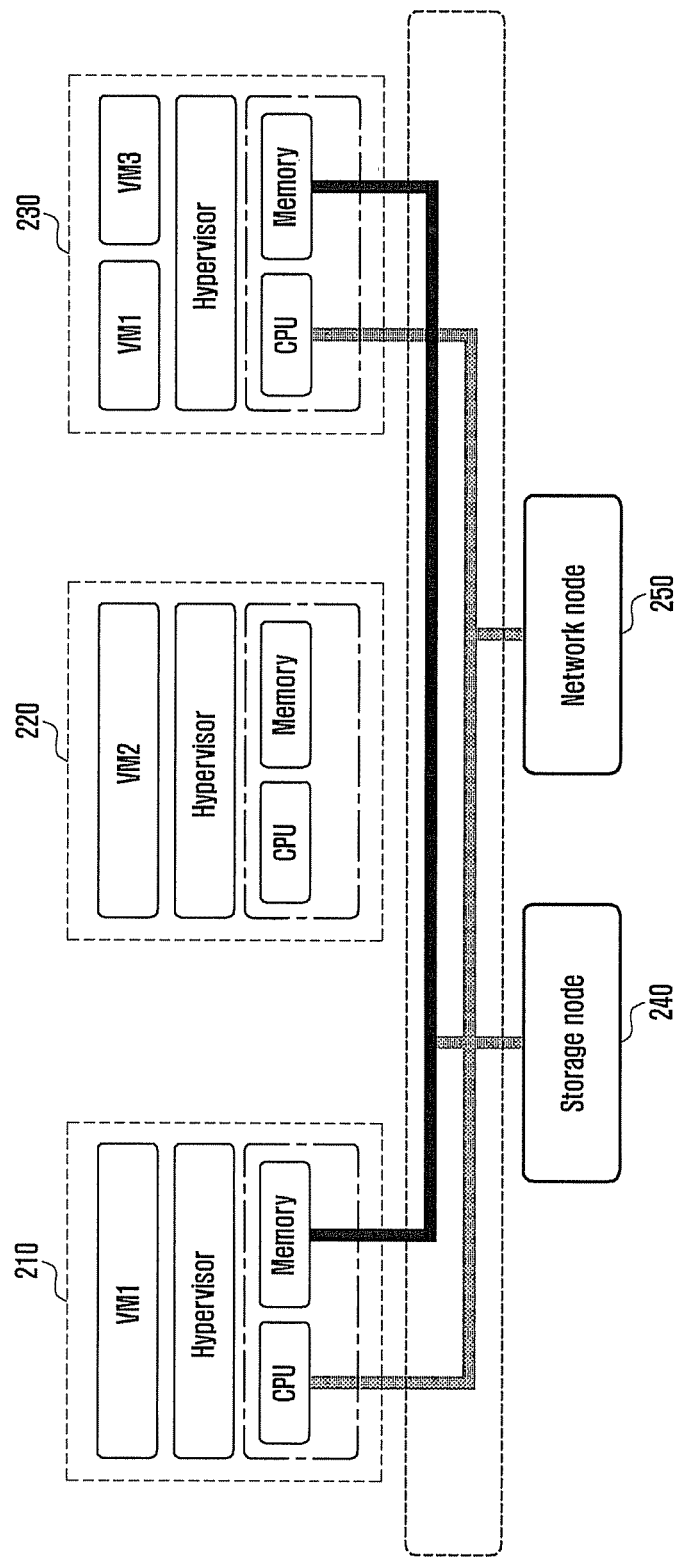
FIG. 2 is a diagram showing a structure of a data center or a server cluster according to an embodiment of the present invention.

FIG. 2 is a diagram showing a structure of a data center or a server cluster in accordance with an embodiment of the present invention.

As shown in FIG. 2, a data center or a server cluster of the present invention may include a plurality of computing nodes 210, 220, and 230, a storage node 240, and a network node 250. Here, the storage node 240 and the network node 250 excepting for the computing nodes 210, 220, and 230 may be referred as an input and output (IO) nodes.

Arbitrary computing nodes may include a virtual machine, a hypervisor, a CPU, memory, and so on.

The virtual machine may mean software in charge of an interface between a compiled binary code and a microprocessor (or a hardware platform) that actually executes a command of a program. More specifically, when operating a plurality of operating systems, the virtual machine may mean hypothetical hardware generated to operate as hardware is actually driven by each of the operating systems. This causes the user to feel as if the user monopolizes all the resources of the system.

The hypervisor means a logical platform to run multiple operating systems simultaneously on a host computer. A single computing node may drive a plurality of virtual machines through the hypervisor.

The Central Processing Unit (CPU) executes a computation, and the memory stores data on a temporary or permanent basis.

In the data center or the server cluster, Virtual Machine migration (VM Migration) is one of the most effective methods for low power. The virtual machine migration realizes the low power by migrating a large number of virtual machines to a small number of computing nodes and then blocking off the power of the computing nodes that do not need to operate, when the computation or input/output is not frequently performed at a particular time or workload.

The virtual machine migration may include a static virtual machine migration (Static VM Migration) method and a live virtual machine migration (Live VM Migration) method.

For the static VM migration, since a memory image of the virtual machine to be migrated is stored in the shared storage and then the memory image is read again by another computing machine to migrate, the migration time reduction is important.

The live VM migration is a technology for migrating the virtual machine to another computing node even while the virtual machine is in operation. The live VM migration technology gradually copies the contents of the memory of the virtual machine to another computing node and performs the migration of the virtual machine of the computing node being migrated at the last-minute, and for the live VM migration, it is important to minimize a service delay time.

In the data center and server cluster environment, since a large number of computing nodes are integrated, the optimized virtual machine migration is a very important factor for the low power.

In order to implement this, the present invention proposes a switching connection unit that transmits information of the virtual machine, the data block and the like. According to a preferred embodiment of the invention, the switching connection unit may be implemented through an interconnection fabric switch, which is a preferred embodiment and it should be noted that there is no need to be limited to the interconnection fabric switch. According to an embodiment of the present invention which will be described below, drawings are illustrated on an assumption that the switching connection unit is the interconnection fabric switch and the description will be given accordingly.

The interconnection fabric switch of the present invention is shown at 250 in FIG. 2. The fabric switch refers to a network topology in which the network nodes are connected to each other through one or more network switches (in particular, a crossbar switch). The interconnection fabric switch of the present invention may directly connect the computing node and the input/output node (for example, the storage node and the network node) to quickly implement the migration of the virtual machine, etc.

In other words, according to the prior art, when the migration of the virtual machine, etc. is needed, the virtual machine is migrated from the first computing node to the second computing node via the network node corresponding to a separate input/output node. On the other hand, according to the present invention, the virtual machine is directly migrated from the first computing node to the second computing node via the interconnection fabric switch without passing through the network node. Therefore, it is possible to reduce time to migrate a virtual machine, etc. and thus power consumption can also be reduced.

Hereinafter, embodiments of the present invention which configure a low-power data center or a server cluster using the interconnection fabric switch will be described.

Figure 3:
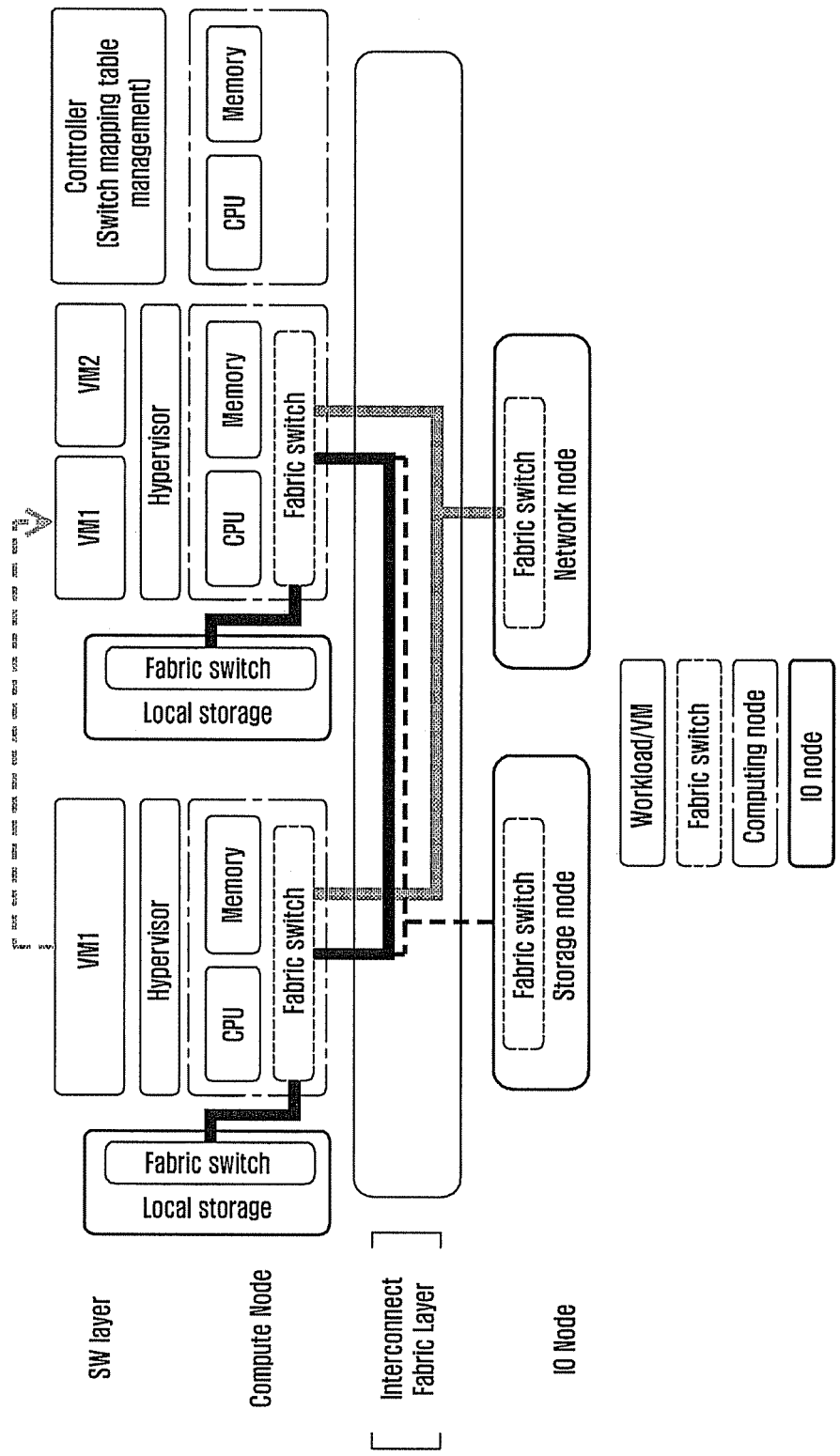
FIG. 3 is a diagram showing a data center or a server cluster provided with an interconnection fabric switching apparatus according to an embodiment of the present invention.

FIG. 3 is a diagram showing a data center or a server cluster provided with an interconnection fabric switching apparatus according to an embodiment of the present invention.

According to an embodiment of the present invention shown in FIG. 3, when migrating an image relating to the virtual machine between computing nodes, a method of directly migrating the virtual machine through the interconnection fabric switch without passing through the network node will be described. In this case, when the local storage is located in the computing node, the data stored in the local storage also is directly transferred to the target computing node through the interconnection fabric switch.

An embodiment of the present invention shown in FIG. 3 describes a case where the virtual machine 1 is migrated to the computing node provided with a second virtual machine by using the static or live migration, in an environment in which a plurality of computing nodes and an input and output device are connected by a Peripheral Component Interconnect Express (PCIe)-based fabric interconnection or a direct fabric switch.

In this case, when the virtual machine 1 is migrated using the shared storage, the virtual machine 1 is migrated to the computing node of the virtual machine 2, and then the virtual machine 1 maintains the IO node connection that has been conventionally used and thus provides a seamless access to the IO node.

To this end, the policy manager of the present invention maintains the mapping information between the computing nodes and the IO nodes through the mapping table, and when the migration is completed, the policy manager turns-off the power of the computing nodes in which the virtual machine 1 was located and updates the mapping table. Then, the migrated virtual machine 1 has a seamless access to the IO nodes as usual without modification of the operating system, etc. According to an embodiment of the present invention which will be described below, the policy manager is referred to as a controller in a sense that the policy manager generally controls an operation of the switching connection unit so as to dynamically allocate resources according to the workload of the present invention.

In addition, the virtual machine 1 requests for access to the local storage of the computing node which is the subject to be migrated in order to transfer contents (data) relating to the local storage as well as the contents of the local memory. Then, the controller may set a switching path of the local storage for the target computing node and may copy data stored in the local storage of the virtual machine 1 to the target computing node by using a method of an incremental copy of the live migration, etc. In this case, since the copying is performed by accessing the storage only within the target node without passing through the network node, the network traffic can be removed and copying performance can be enhanced. In addition, it is possible to minimize an impact on the performance of the target computing node in operation.

The virtual machine migration method by the data center or the server cluster provided with an interconnection fabric switching apparatus shown in FIG. 3 will be described based on the above description.

Each of the computing nodes 310, 320, and 330 may include a CPU for performing computation, a memory for storing data, and a fabric switch for connecting between nodes. In FIG. 3, the fabric switch is shown included in the computing nodes. It should be noted, however, that the fabric switch is not limited to such a configuration and may be implemented in an interconnection fabric layer.

Further, each computing node may include local storages 311 and 321. In this case, the computing nodes and the local storages can be connected through the fabric switch.

As described above, the upper layer of each computing node may include the hypervisor and a virtual machine that is driven on the basis of the hypervisor.

The IO nodes illustrated in FIG. 3 are storage nodes and network nodes, and in addition, various input/output nodes may be connected to a data center.

The controller 350 controls a signal flow among each of the nodes in accordance with an embodiment of the invention. More specifically, when migrating the image relating to the virtual machine among the computing nodes, the controller 350 controls a set of process for directly migrating through the interconnection fabric switch of the interconnection fabric layer without passing through the network node.

In addition, the controller 350 stores the switch mapping table and manages an interconnection relationship among fabric switches through the mapping table.

For example, upon initially driving the system, when the computing node 310 is connected to the storage node 330 (through the fabric switch) and the computing nodes 320 is connected to the network node 340, the controller 350 manages the mapping table as shown in Table 1.

TABLE 1

| 310 <-> 330 |
| 320 <-> 340 |

Thereafter, when the computing node 310 and the computing node 320 are connected to each other for the migration of the virtual machine 1, the controller 350 updates the mapping table of Table 1 to Table 2 below.

TABLE 2

| 310 <-> 320 |
| 320 <-> 340 |

Thereafter, when the computing node 310 and the computing node 320 are connected to each other for the migration of the virtual machine 1, the controller 350 updates the mapping table of Table 1 to Table 2 below.

TABLE 3

| 320i <-> 330 |
| 320ii <-> 340 |

The controller 350 according to an embodiment of the present invention manages a mapping table according to the migration of the virtual machine, as shown in Table 1 to Table 3 above.

On the other hand, an embodiment of the present invention is not limited to the above-described method and may also use a network file system (NFS) to minimize the modification for the hypervisor and the virtual machine. In this case, the virtual machine may be migrated to the target computing node through the NFS connection. In this case, when migrating the virtual machine, the ID of the virtual machine is checked without passing through the network IO nodes and is directly mounted on a target file system to perform the connection.

Figure 4:
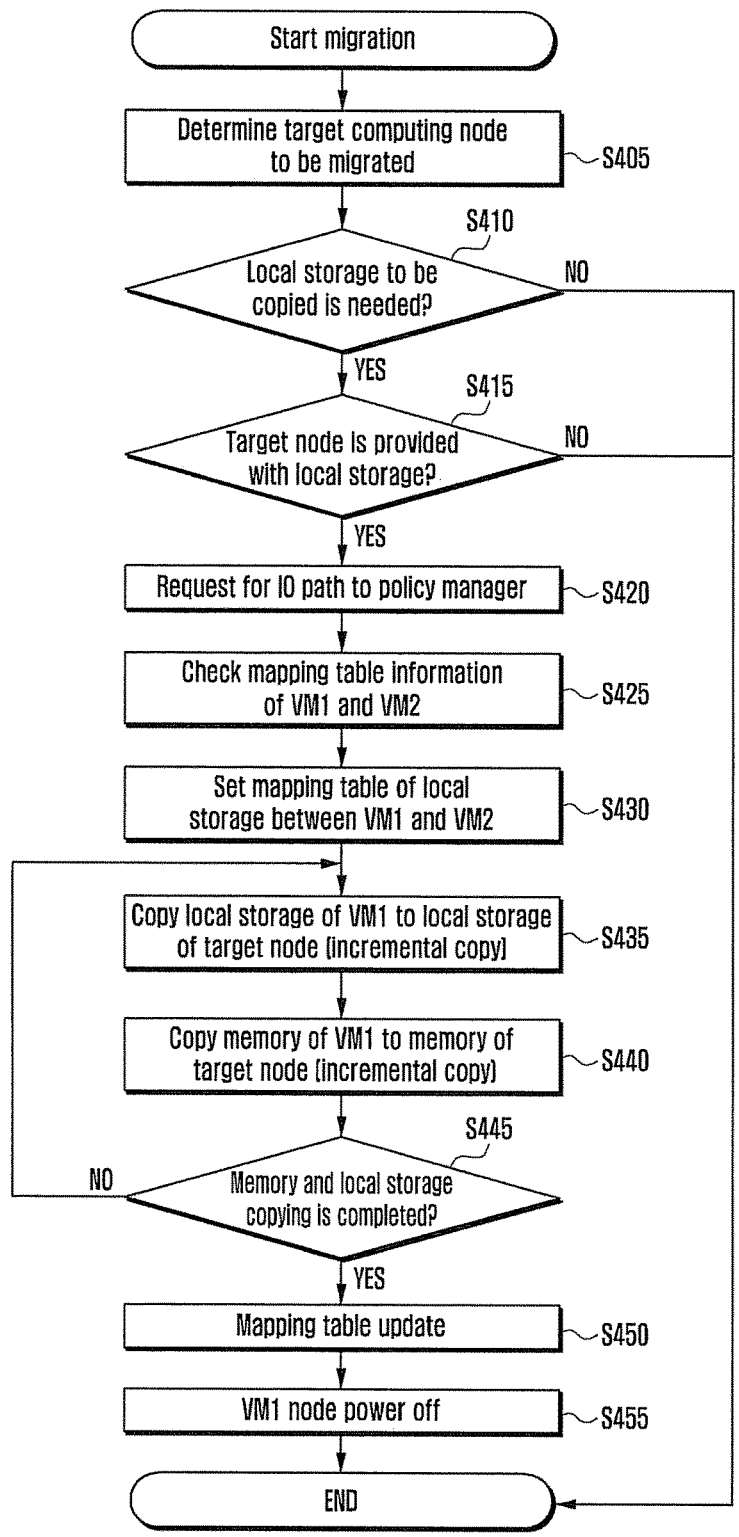
FIG. 4 is a flowchart showing an interconnection fabric switching operation sequence capable of allocating dynamic resources depending on a workload according to an embodiment of the present invention.

FIG. 4 is a flowchart showing an interconnection fabric switching operation sequence capable of allocating dynamic resources according to a workload according to an embodiment of the present invention.

In describing the flow chart of FIG. 4, the controller 350 will be described as one for controlling the operation of FIG. 4 and is not necessarily limited to this. It should be noted that a separate controller can perform the operation.

The controller 350 determines the migration of an arbitrary virtual machine, for example, the virtual machine 1. The controller 350 may determine the migration of the virtual machine 1 when the workload of the computing node 1 provided with the virtual machine 1 is overloaded. However, it is not necessarily limited thereto, and when it is determined that there is a hardware problem of the computing node 1, the controller 350 may determine the migration of the virtual machine 1.

When determined to migrate the virtual machine 1, the controller 350 determines a target computing node which will migrate the virtual machine 1 in step S405.

In addition, the controller 350 checks whether the computing node 1 is provided with a local storage to be migrated (copied) thereto in step S410. When the computing node 1 has the local storage, the controller 350 proceeds to step S415 and checks whether the target computing node is provided with the local storage.

When the target computing node has the local storage, the controller 350 receives a request for changing an IO path of the computing node 1 in step S420 and the process proceeds to step S425, the controller 350 checks the mapping table information (for example, Table 1) of the virtual machine 1 and the virtual machine 2. In addition, the controller 350 controls to migrate the virtual machine 1 to the computing node 2 through the interconnection fabric switch.

In addition, the controller 350 proceeds to step S430 to set a mapping table (for example, Table 2) for the local storage between the virtual machine 1 and the virtual machine 2.

Thereafter, the controller 350 controls to copy the data stored in the local storage of the virtual machine 1 to the local storage of the target computing node in step S435. In this case, the data is copied from the local storage of the virtual machine 1 via the interconnection fabric switch to the local storage of the target computing node, according to the embodiment of the present invention.

Similarly, the controller 350 controls to copy the data stored in the memory of the virtual machine 1 to the memory of the target computing node through the interconnection fabric switch in step S440.

In addition, the controller 350 determines whether copying of the data of the memory and the local storage is completed in step S445. When the data copying is not completed, the controller 350 returns to step S435 and proceeds the copying.

When the data copying is completed, the controller 350 proceeds to step S450 to finally update the mapping table (for example, Table 3).

In addition, the controller 350 proceeds to step S455 and controls to power off the computing node 1 to which the virtual machine 1 is migrated.

Figure 5:
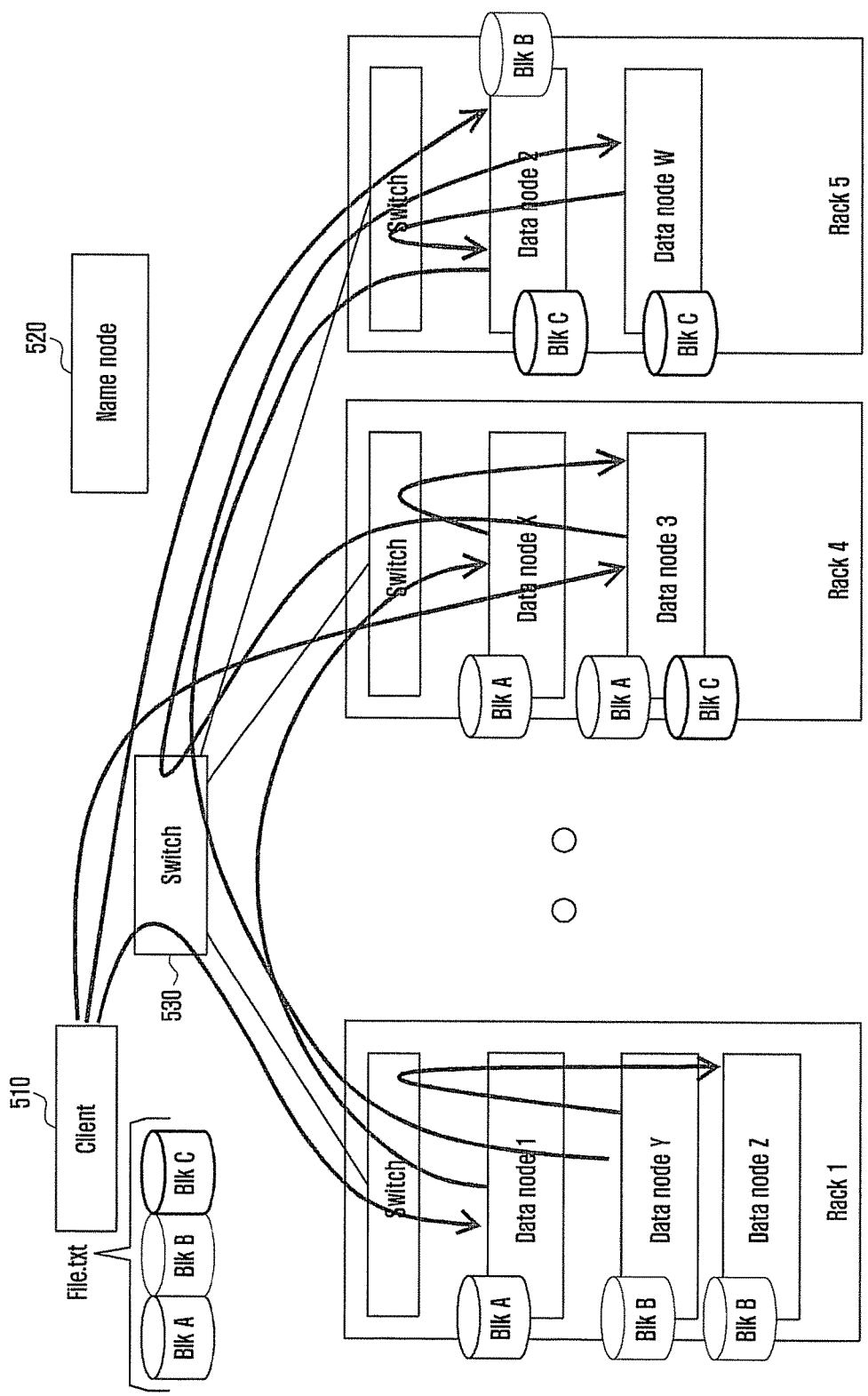
FIG. 5 is a diagram showing a Hadoop framework that is applied to another embodiment of the present invention.

FIG. 5 is a diagram showing a Hadoop framework that is applied to another embodiment of the present invention.

The Hadoop framework is a free Java software framework for supporting a distributed application program operating on a large computer cluster capable of handling large amounts of data.

Due to the frequent data copying, heavy network traffic is generated at the workload such as a distributed computing/storage for large data processing, and thus the latency increases.

In order to solve the above problems, in the Hadoop framework, a large amount of data is divided on the client node 510 and the data is copied to the plurality of data nodes (data nodes 1, 2, 3, etc.) according to the setting of the name node 520. In this case, for reliability, data backups are performed at three or more remote data nodes and in this case, the data copying can be achieved through a large number of switches existing on the network IO nodes and thus the latency is generated.

Therefore, a method for minimizing the data copying is required in order to minimize the network traffic and quickly respond to a request from the client node 510.

A distributed computing/storage solution, such as the Hadoop framework, is a server workload which recently has received attention to extend a micro server market. However, the micro server has a limited number of network IO nodes and a limited computing power in order to maximize the low power. Accordingly, when the network traffic occurs, it is impossible to guarantee the quality of service relating to performance and the low power.

Figure 6:
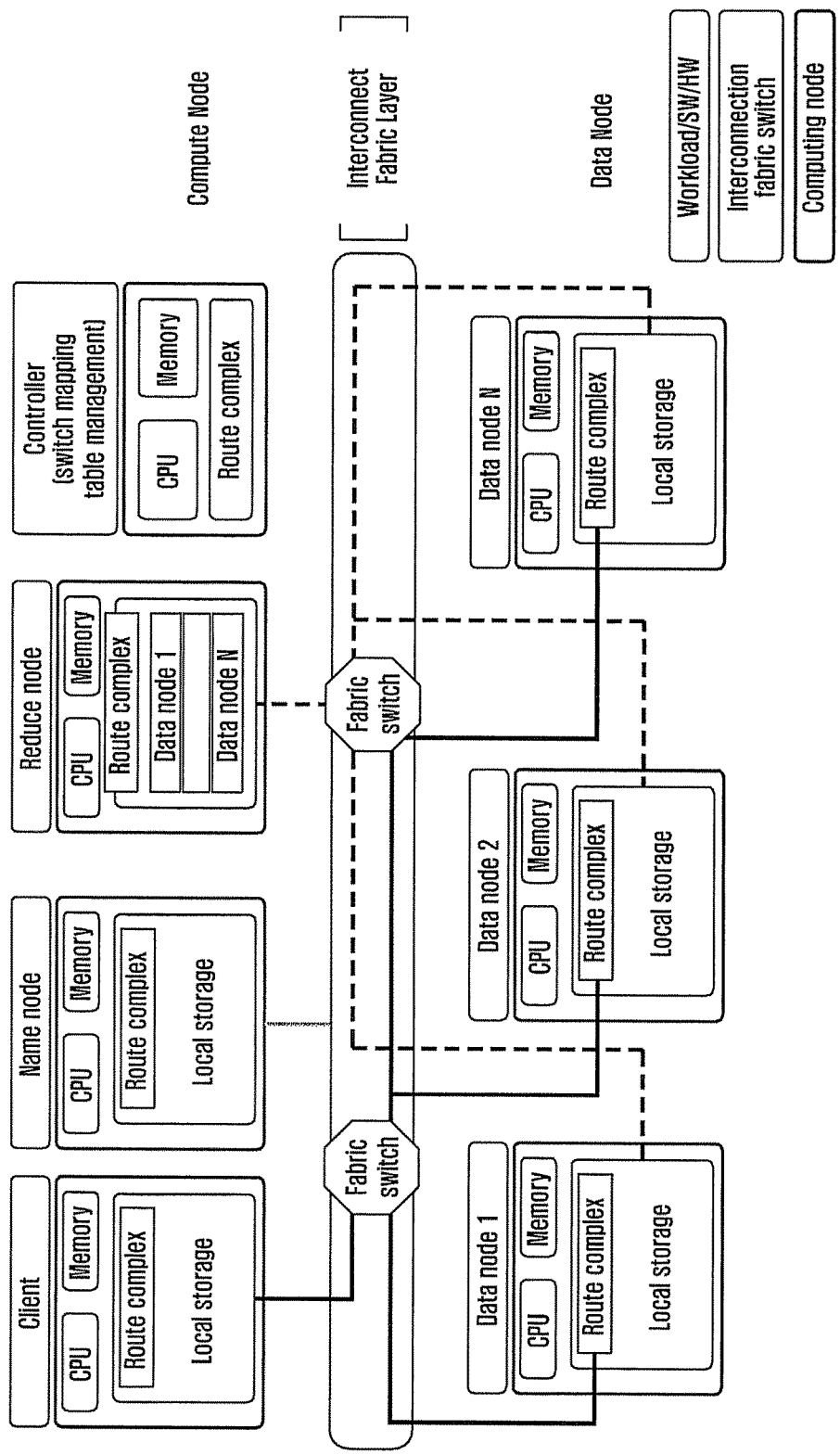
FIG. 6 is a diagram showing a data center or a server cluster provided with an interconnection fabric switching apparatus according to an embodiment of the present invention.
Figure 7:
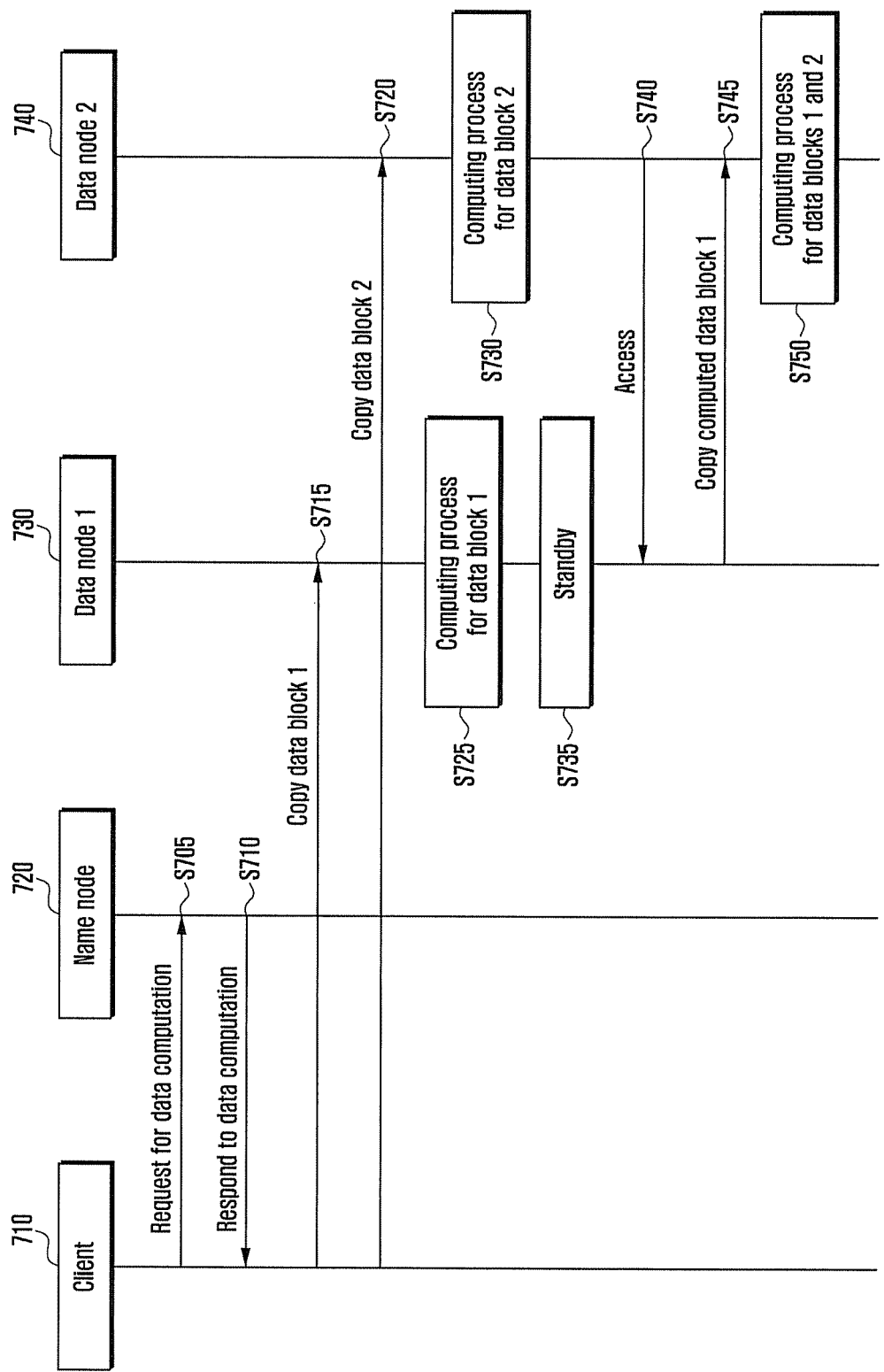
FIG. 7 is a flowchart showing an interconnection fabric switching process according to an embodiment of FIG. 6.

The present invention is to provide a means to solve the above problems, and a description will be provided through FIGS. 6 and 7.

FIG. 6 is a diagram showing a data center or a server cluster provided with an interconnection fabric switching apparatus according to an embodiment of the present invention.

The client node requests the separation of a large amount of data block by a name node. Then, the name node informs, in response to the request, of information on the separation of the large amount of data block and information on a data node which will copy the separated data block, to the client node.

Then, the client node divides the large amount of data block into a plurality of data blocks, and directly (via the interconnection fabric switch) copies the data blocks to the storage (preferably, the local storage) of the target data node without passing through the IO nodes (e.g., network node).

In this case, the controller updates the mapping table in order to maintain a connection relationship between the client node and the target data node. Since the mapping table management method is described in the above, a detailed description will be omitted, and it will not significantly depart from the spirit of the management method of the mapping table shown in the Table 1 to Table 3.

Then, each data node performs a given computation for the data block copied from the client node. Each data node uses information of the name node in order to avoid unnecessary duplication (redundancy).

As described above, in the Hadoop framework to which the embodiment of the present invention is applied, the copying is performed directly through the interconnection fabric switch between the client node and the data nodes without the overhead for the network node and thus the performance is improved and the delay is shortened.

In addition, according to an embodiment of the present invention, for example, the data node 1 processes the data block 1 to output a data block 1-1, and it is assumed that the data block 1-1 is necessary for the processing of a data block 2-2 which is processed by the data node 2.

In this case, in general, the data node 1 directly transmits (copies) the data block 1-1 output by the data node 1 itself to the data node 2, and in this case, there is a risk of delaying the processing time due to the frequent copying. In order to solve this problem, according to the present invention, each data node stores the data block which is processed by each data node itself. Further, when the time point of merging the processed data blocks approaches, a reduce node accesses to each data node and copies the processed data blocks. Furthermore, the reduce node merges the data blocks according to a predetermined rule.

Any one node among the plurality of data nodes may act as the reduce node, or the reduce node may be a separate node for merging the data blocks.

According to the embodiment, when the reduce node accesses a block link that is pointing at each data, the mapping table is updated so that the access is mapped to a storage block stored in each of the data nodes.

According to the embodiment, the frequent copying of the data blocks can be prevented by the respective data nodes and thus the overhead for the copying can be eliminated and the excessive network traffic can be controlled.

Further, according to another embodiment of the invention, the NFS can be used in the Hadoop framework, etc. in order to minimize the modifications to the hypervisor and the operating system. In this case, the Hadoop framework may check the ID of the virtual machine and directly mount the target file system on the file system to support direct access without passing through the network IO nodes.

According to the embodiment, the controller dynamically determines the interconnection fabric switching according to the workload. More particularly, the controller dynamically performs the fabric switching according to the routing rules of the name node. At the same time, the controller manages the mapping table for the interconnection fabric switching between the client node and the IO nodes.

FIG. 7 is a flowchart showing an interconnection fabric switching process according to an embodiment of FIG. 6.

First, the client node 710 requests the name node 720 to compute the large amounts of data in step in step S705. Then, the name node 720 responds, to the client node 710, with information on a separation method of the large amounts of data and information on the target data node to which the separated data block will be copied, in step S710.

Then, the client node 710 separates the large amounts of data based on the response. In addition, the client node 710 copies the data block 1 to the data node 1 730 in step S715 and copies the data block 2 to the data node 2 740 in step S720.

Then, the data node 1 730 performs a computation on the data block 1 in step S725 and the data node 2 740 performs a computation on the data block 2 in step S730.

In addition, in the description with reference to FIG. 7, it is assumed that the data node 2 740 simultaneously performs the role of the reduce node for merging the respective data blocks.

The data node 1 730 processes the data block 1 and then maintains the standby state in step S735. On the other hand, when the merging time point for the computed data blocks comes, the data node 2 740 accesses the data node 1 730 in step S740. Further, the data node 2 740 copies the data block 1 output by the data node 1 730 in step S745.

Then, the data node 2 740 performs a computation, that is a merge computation, on the data block 1 and the data block 2 in step S750.

Figure 8:
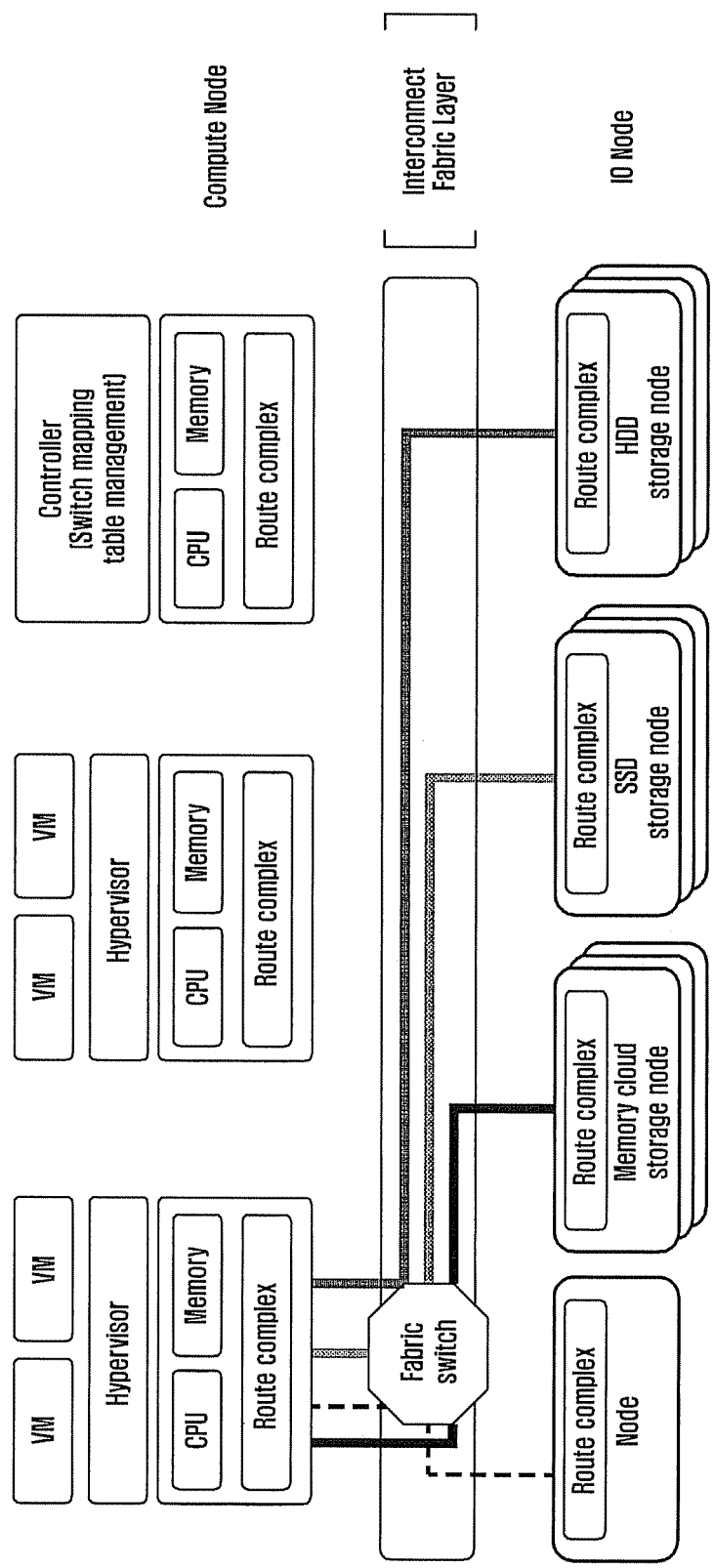
FIG. 8 is a diagram showing a data center or a server cluster provided with an interconnection fabric switching apparatus according to another embodiment of the present invention.

FIG. 8 is a diagram showing a data center or a server cluster provided with an interconnection fabric switching apparatus according to another embodiment of the present invention.

The embodiment shown in FIG. 8 refers to a method for maximizing the performance depending on the workload in an interconnection fabric switching-based environment of a data center and a micro server.

More particularly, when the data is for the workload such as a mem-cache requesting the low latency and a search index service, a controller 800 controls to store the data in a memory cache card 810 or a high-performance Solid State Drive (SSD) storage 820. In this case, the controller manages, in the mapping table form, a relationship between the data and the storage in which the data is stored.

On the other hand, a large capacity, a large amount of video streaming which is non-sensitive to delay, or the workload for processing large amounts of data are controlled to be stored in the storage node 830 such as a Hard Disk Drive (HDD).

According to the present invention, the information between computing nodes is directly exchanged through an interconnection fabric switch without passing through the IO nodes such as the network nodes. Therefore, a time for exchanging, migrating, and copying of information can be significantly reduced to maximize the low-power computing performance.

Further, according to the present invention, a virtual machine, etc. is migrated from a first computing node to a second computing node depending on a workload and then the power of the first computing node is turned-off and thus computing and input and output resources are effectively managed and operating costs savings are also possible.

Embodiments of the present invention disclosed in the specification and the drawings are only particular examples to easily describe the technical matters of the present invention and assist in the understanding of the present invention, and do not limit the scope of the present invention. It is apparent to those skilled in the art that other modified examples based on the technical idea of the present invention can be implemented as well as the embodiments disclosed herein.

The invention claimed is:

1. An apparatus for controlling a switching connection for at least one node, comprising:
    at least one computing node;
    a switching connection unit that switching-interconnects between the at least one computing node and an input/output node; and
    a controller that analyzes a workload on the at least one computing node, determines whether to migrate a virtual machine of a first computing node to a second computing node according to the analyzed result, and when it is determined to migrate the virtual machine, controls the switching operation of the switching connection unit to migrate the virtual machine of the first computing node to the second computing node via the switching connection unit;
    wherein the controller controls the switching operation of the switching connection unit to copy data stored in a first local storage of the first computing node to a second local storage of the second computing node via the switching connection unit, when it is determined to migrate the virtual machine,
    wherein the controller manages the connection relation between each of the computing nodes and the input/output node through a mapping table.

2. The apparatus of claim 1, wherein the controller migrates, at the time for migration of the virtual machine, the virtual machine from the first computing node to the second computing node without passing through the input/output node.

3. The apparatus of claim 1, wherein the controller controls to turn-off the power of the first computing node after the migration of the virtual machine.

4. The apparatus of claim 1, wherein the computing node comprises a server or a micro server.

5. The apparatus of claim 1, wherein the controller determines whether the first computing node is provided with the first local storage when determined to migrate the virtual machine, and when it is determined to have the first local storage, the controller controls the switching operation of the switching connection unit to copy the data stored in the first local storage of the first computing node to the second local storage of the second computing node via the switching connection unit.

6. A method for controlling a switching connection for at least one node, comprising:
   analyzing a workload on at least one computing node;
   determining whether to migrate a virtual machine of a first computing node to a second computing node, according to the analyzed result;
   when it is determined to migrate the virtual machine, switching the switching connection unit to migrate the virtual machine of the first computing node to the second computing node via the switching connection unit and to copy data stored in a first local storage of the first computing node to a second local storage of the second computing node via the switching connection unit;
   managing the connection relation between each of the computing nodes through a mapping table;
   migrating the virtual machine from the first computing node to the second computing node through the switching connection unit; and
   copying the data stored in the first local storage of the first computing node to the second local storage of the second computing node via the switching connection unit,
   wherein the switching connection unit switching-interconnects between the computing node and an input/output node.

7. The method of claim 6, wherein the migrating of the virtual machine comprises migrating the virtual machine from the first computing node to the second computing node without passing through the input/output node.

8. The method of claim 6, further comprising: turning-off the power of the first computing node after the virtual machine migration.

9. The method of claim 6, wherein the computing node comprises a server or a micro server.

10. The method of claim 6, wherein the migrating of the virtual machine further comprises:
   determining whether the first computing node is provided with the first local storage when it is determined to migrate the virtual machine.

* * * * *